(12) United States Patent
Shirota et al.

(10) Patent No.: US 10,635,587 B2
(45) Date of Patent: Apr. 28, 2020

(54) MEMORY CONTROLLER, INFORMATION PROCESSING APPARATUS, AND PROCESSOR

(71) Applicant: TOSHIBA MEMORY CORPORATION, Minato-ku, Tokyo (JP)

(72) Inventors: Yusuke Shirota, Yokohama Kanagawa (JP); Tatsunori Kanai, Yokohama Kanagawa (JP); Masaya Tarui, Yokohama Kanagawa (JP)

(73) Assignee: TOSHIBA MEMORY CORPORATION, Tokyo (JP)

( * ) Notice: Subject to any disclaimer, the term of this patent is extended or adjusted under 35 U.S.C. 154(b) by 89 days.

(21) Appl. No.: 15/869,287

(22) Filed: Jan. 12, 2018

(65) Prior Publication Data

US 2018/0136849 A1    May 17, 2018

Related U.S. Application Data

(63) Continuation of application No. PCT/JP2015/070438, filed on Jul. 16, 2015.

(51) Int. Cl.
*G06F 12/0808* (2016.01)
*G06F 12/0815* (2016.01)
(Continued)

(52) U.S. Cl.
CPC .......... *G06F 12/0808* (2013.01); *G06F 3/061* (2013.01); *G06F 3/065* (2013.01);
(Continued)

(58) Field of Classification Search
None
See application file for complete search history.

(56) References Cited

U.S. PATENT DOCUMENTS

2004/0243535 A1   12/2004   Bailey
2006/0020752 A1 *  1/2006   Schnapp ............. G06F 12/0804
                                                          711/113
(Continued)

FOREIGN PATENT DOCUMENTS

JP        2004-362570        12/2004

OTHER PUBLICATIONS

International Search Report and Written Opinion for International Patent Application No. PCT/JP2015/070438 dated Aug. 25, 2015, 7 pages.

*Primary Examiner* — Charles J Choi
(74) *Attorney, Agent, or Firm* — Oblon, McClelland, Maier & Neustadt, L.L.P.

(57) ABSTRACT

According to one embodiment, a memory controller includes a nonvolatile cache memory and a controller. The nonvolatile cache memory is configured to store a piece of data stored in a nonvolatile main memory connected to the memory controller. The controller is configured to control writing of data to the nonvolatile cache memory. The memory controller is connected to a processor via an interconnect that ensures a protocol indicating a procedure for preventing data inconsistency in a plurality of cache memories. The controller causes, after detecting that the processor has updated data corresponding to any area of the nonvolatile main memory using the protocol, the updated data to be transmitted to the memory controller and writes the updated data to the nonvolatile cache memory.

9 Claims, 14 Drawing Sheets

(51) Int. Cl.
*G06F 12/0831* (2016.01)
*G06F 12/08* (2016.01)
*G06F 3/06* (2006.01)
*G06F 12/0868* (2016.01)

(52) U.S. Cl.
CPC .......... *G06F 3/0614* (2013.01); *G06F 3/0688* (2013.01); *G06F 12/08* (2013.01); *G06F 12/0815* (2013.01); *G06F 12/0831* (2013.01); *G06F 12/0868* (2013.01); *G06F 2212/1016* (2013.01); *G06F 2212/1032* (2013.01); *G06F 2212/222* (2013.01); *G06F 2212/312* (2013.01); *G06F 2212/604* (2013.01); *G06F 2212/621* (2013.01)

(56) References Cited

U.S. PATENT DOCUMENTS

| | | | |
|---|---|---|---|
| 2008/0183972 A1* | 7/2008 | Dieffenderfer | G06F 12/0831 711/146 |
| 2011/0066808 A1* | 3/2011 | Flynn | G06F 12/0246 711/118 |
| 2016/0210239 A1* | 7/2016 | Wang | G06F 12/0811 |

* cited by examiner

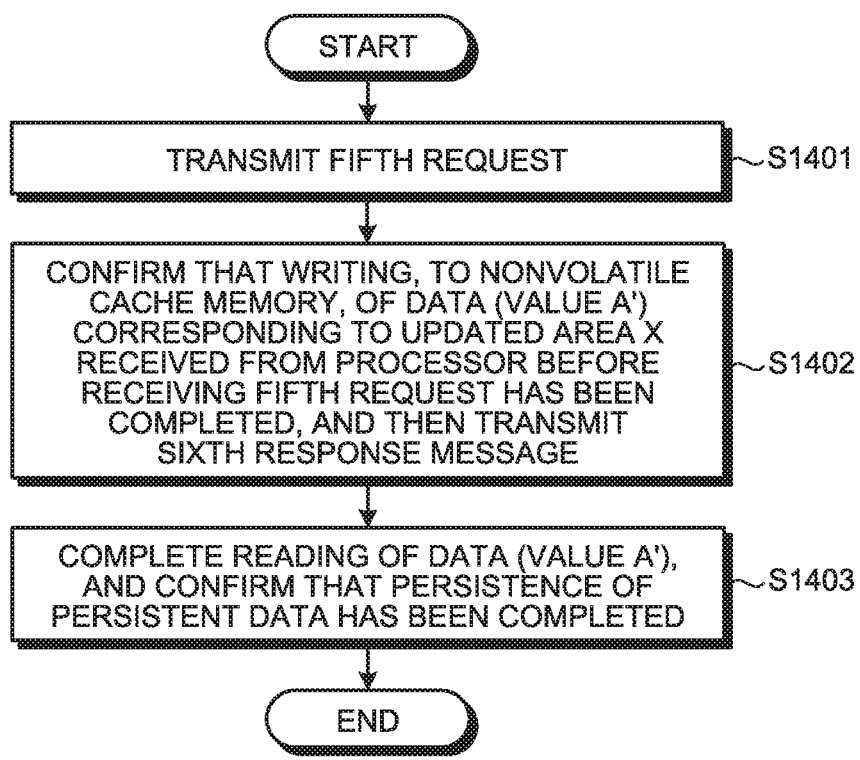

US 10,635,587 B2

MEMORY CONTROLLER, INFORMATION PROCESSING APPARATUS, AND PROCESSOR

CROSS-REFERENCE TO RELATED APPLICATIONS

This application is a continuation of PCT international Application Ser. No. PCT/JP2015/070438, filed on Jul. 16, 2015, which designates the United States; the entire contents of which are incorporated herein by reference.

FIELD

Embodiments of the present invention relate to a memory controller, an information processing apparatus, and a processor.

BACKGROUND

In an application required to have high reliability and high performance such as an online transaction processing system, when a computer system that uses a byte-addressable high-speed nonvolatile memory directly connectable to a memory bus of a processor, such as a magnetoresistive random access memory (MRAM), a phase change memory (PCM), or a memristor, as a main memory (persistent memory) is used and important data is stored in the main memory, data can be persisted. Thus, data can be persisted more quickly than the case in which data is stored in a hard disk or a solid state drive (SSD) like conventional systems, and it is possible to improve the performance of an application such as an online transaction processing database application.

In addition, since the transaction processing system is also required to have high reliability, a persistent data update processing method that ensures atomicity (a property of not ending in the middle of writing) in writing to a nonvolatile memory by a program executed on a processor and ordering is necessary.

However, with conventional techniques, it is difficult to achieve a sufficiently high-performance and high-reliability data persistence processing method.

BRIEF DESCRIPTION OF THE DRAWINGS

FIG. 15 is a diagram illustrating an operation example of the information processing apparatus in the second embodiment.

DETAILED DESCRIPTION

In general, according to one embodiment, a memory controller includes a nonvolatile cache memory and a controller. The nonvolatile cache memory is configured to store a piece of data stored in a nonvolatile main memory connected to the memory controller. The controller is configured to control writing of data to the nonvolatile cache memory. The memory controller is connected to a processor via an interconnect that ensures a protocol indicating a procedure for preventing data inconsistency in a plurality of cache memories. The controller causes, after detecting that the processor has updated data corresponding to any area of the nonvolatile main memory using the protocol, the updated data to be transmitted to the memory controller and writes the updated data to the nonvolatile cache memory.

With reference to the accompanying drawings, a memory controller, an information processing apparatus, and a processor according to the present invention will be described in detail.

First Embodiment

Before detailed description, the outline of the present embodiment will be described together with a conventional technique. In an online transaction processing system or the like required to have high reliability and high performance, when a computer system that uses a byte-addressable high-speed nonvolatile memory directly connectable to a memory bus of a processor, such as an MRAM, a PCM, or a memristor, as a main memory is used and important data is stored in the main memory, the data can be persisted. Thus, it can be possible to accelerate a process for persisting data in a database (a commit process) as compared with the case in which data is stored in a hard disk or an SSD like conventional systems.

In the present embodiment, the commit process is to be further accelerated by incorporating a nonvolatile cache memory that operates faster than a high-speed nonvolatile memory for such main memories in a memory controller connected to a nonvolatile main memory and ensuring persistence of data written to the nonvolatile cache memory. The nonvolatile cache memory is a nonvolatile memory such as an MRAM, a PCM, or a memristor that operates at a speed similar to an SRAM.

Figure 1:
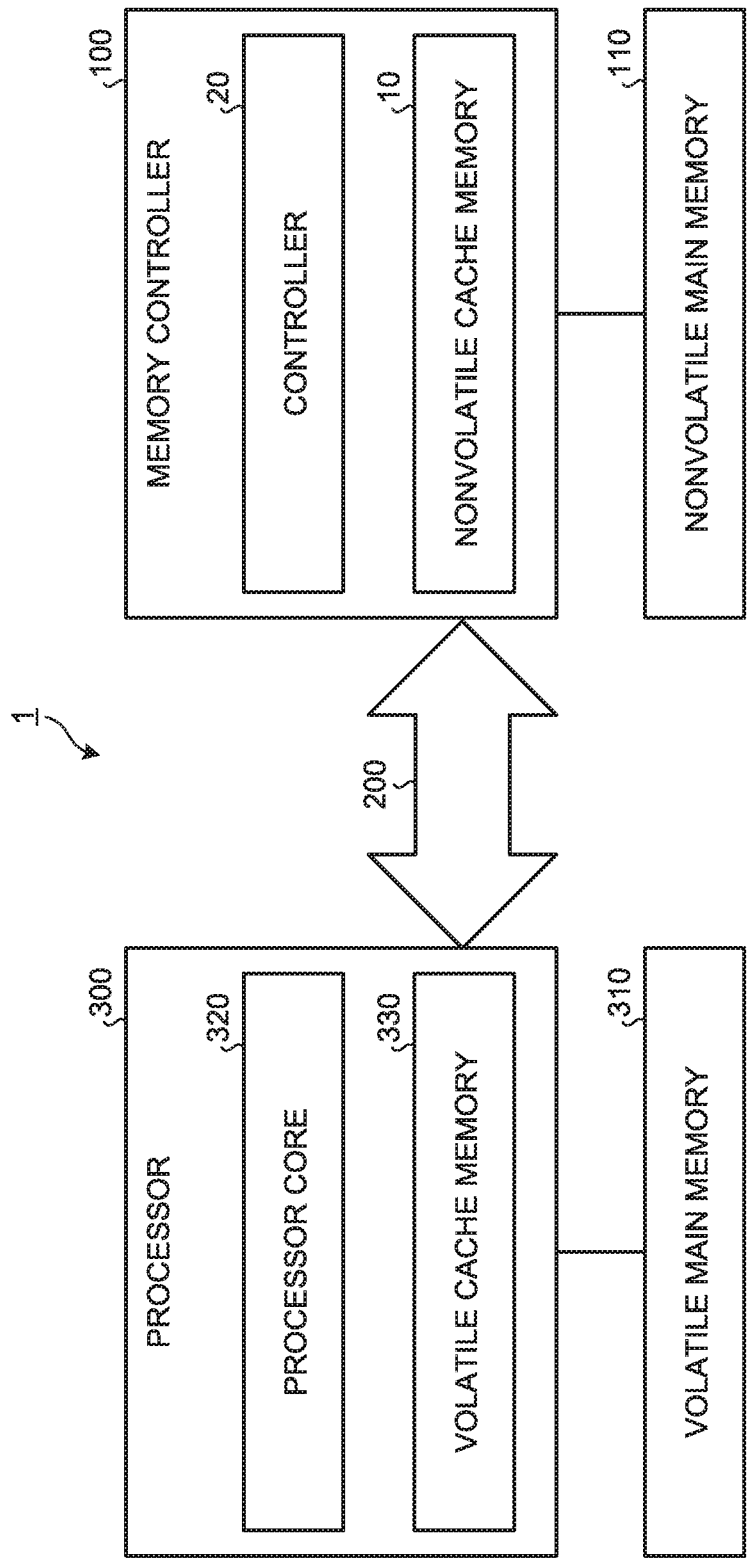
FIG. 1 is a diagram illustrating an example of a configuration of an information processing apparatus in a first embodiment.

As illustrated in FIG. 1, in the present embodiment, a memory controller 100 incorporating a nonvolatile cache memory 10 is connected to a processor (typically a CPU corresponding to a "processor") 300 via a high-speed interconnect (cache coherent interconnect) 200 such as the Intel QuickPath Interconnect (QPI). The interconnect 200 ensures a cache coherence protocols, such as an MESIF protocol, a protocol implemented by the QPI (QPI protocol), an MESI protocol, and an MOESI protocol, indicating a procedure for preventing data inconsistency in cache memories (maintaining coherency in cache memories) of a plurality of processors (or processor cores). The detailed configuration of FIG. 1 will be described later.

These cache coherence protocols are generally designed to connect processors to each other, but are used to connect a processor to a memory controller in order for the memory controller to perform control in the present embodiment. Furthermore, these cache coherence protocols are generally designed to maintain coherence between volatile caches, but are used to maintain coherence between a volatile cache and a nonvolatile cache (or between nonvolatile caches) to persist update by reflecting the update to the volatile cache in the nonvolatile cache in the present embodiment.

Figure 2:
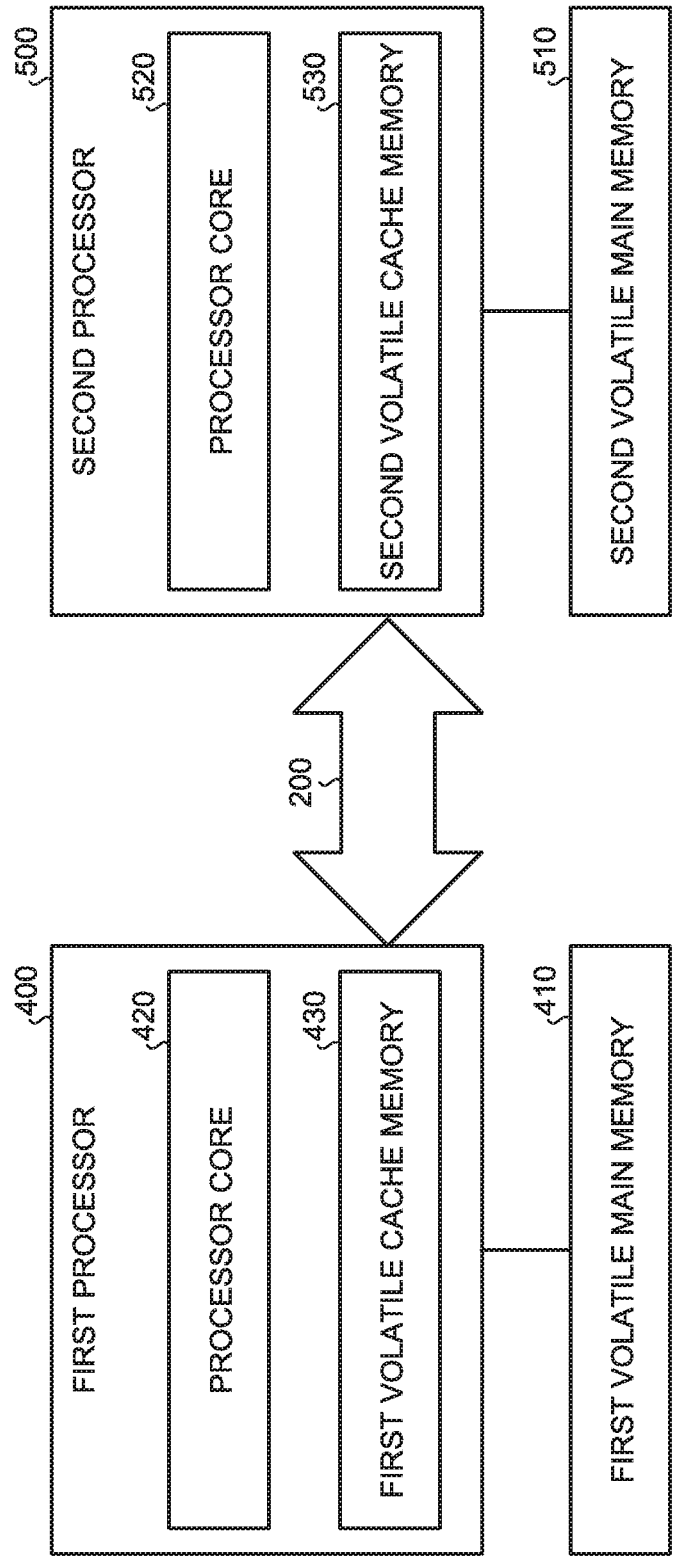
FIG. 2 is a diagram illustrating an example of a configuration of an information processing apparatus in a comparative example.

The configuration of FIG. 1 is also described as a configuration as illustrated in FIG. 2 in which one of two processors (a first processor 400 and a second processor 500), which are directly connected with each other via an interconnect 200 such as the QPI, included in a multiprocessor system (for example, the Intel XEON processor system) is replaced with the memory controller 100 incorporating the nonvolatile cache memory 10.

In the example of FIG. 2, the first processor 400 is connected to a first volatile main memory 410 such as a dynamic random access memory (DRAM), and the second processor 500 is connected to a second volatile main memory 510 such as a DRAM. The first processor 400 includes one or more processor cores 420 (only one processor core 420 is illustrated for the sake of description and others are similar) that read and write data from/to the first volatile main memory 410 or the second volatile main memory 510, and a first volatile cache memory 430 that stores a piece of the data stored in the first volatile main memory 410 or the second volatile main memory 510. The second processor 500 includes one or more processor cores 520 that read and write data from/to the first volatile main memory 410 or the second volatile main memory 510, and a second volatile cache memory 530 that stores a piece of the data stored in the first volatile main memory 410 or the second volatile main memory 510.

Here, the configuration in the present embodiment can be implemented by only preparing the memory controller 100 and connecting an existing processor constituting a multiprocessor system such as the XEON processor system to the memory controller 100 via the interconnect 200 such as the QPI.

Figure 3:
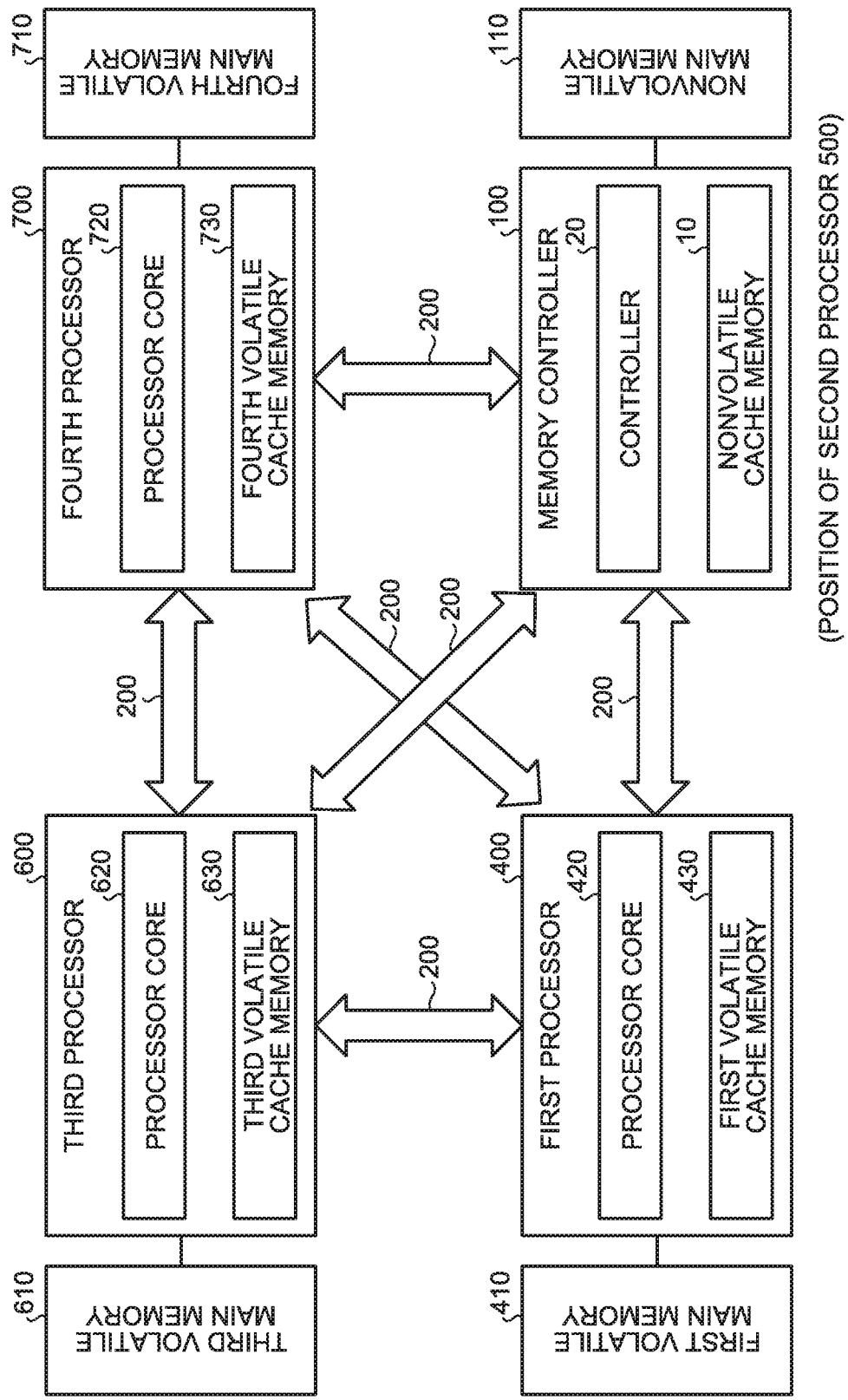
FIG. 3 is a diagram illustrating an example of a configuration of an information processing apparatus in a modified example.

FIG. 3 illustrates another configuration example in which three processors (a first processor 400, a third processor 600, and a fourth processor 700) and a memory controller 100 incorporating a nonvolatile cache memory 10 are connected to each other via an interconnect 200 such as the QPI. However, the configuration is not limited thereto, and may be a configuration in which a plurality of processors and a plurality of memory controllers 100 are connected to each other, and a scalable computer system can be constructed.

In the example of FIG. 3, a first processor 400 is connected to a first volatile main memory 410 such as a DRAM, a third processor 600 is connected to a third volatile main memory 610 such as DRAM, a fourth processor 700 is connected to a fourth volatile main memory 710 such as a DRAM, and a memory controller 100 is connected to a nonvolatile main memory 110 such as an MRAM.

The first processor 400 includes one or more processor cores 420 that read and write data from/to one of the main memories (the first volatile main memory 410, the nonvolatile main memory 110, the third volatile main memory 610, and the fourth volatile main memory 710), and a first volatile cache memory 430 that stores a piece of the data stored in one of the main memories. The third processor 600 includes one or more processor cores 620 that read and write data from/to one of the main memories, and a third volatile cache memory 630 that stores a piece of the data stored in one of the main memories. The fourth processor 700 includes one or more processor cores 720 that read and write data from/to one of the main memories, and a fourth volatile cache memory 730 that stores apiece of the data stored in one of the main memories. The specific configuration of the memory controller 100 will be described later.

In addition, since the transaction processing system is also required to have high reliability, a persistent data update processing method that ensures atomicity (a property of not ending in the middle of writing) in writing to a nonvolatile memory by a program executed on a processor and ordering is necessary.

As a method for ensuring atomicity, there is widely known a method for managing multiple versions of data called the Write Ahead Logging (WAL), the shadow page, and the like. In such programming techniques for persisting data, initially, the original data stored in the main memory is not updated, the value of the data secured in another area of the main memory is updated, and a new version of the data is created to create multiple versions of the data explicitly. Then, after a memory barrier, the original data is updated or the reference to the original data is switched to the reference to the new version of the data, and the like. However, this method cannot sufficiently accelerate the commit process in the system in which the first volatile main memory 410 and the second volatile main memory 510 in FIG. 2 are just replaced with the nonvolatile memories, because it is necessary to access the nonvolatile main memory (persistent memory) to create a new version.

Furthermore, in the case of the above method for managing multiple versions, it is necessary to control the timing so that the writing after the memory barrier is performed after the writing before the memory barrier arrives at the cells of the nonvolatile main memory. When the ordering of writing to the nonvolatile main memory is ensured, there is a problem of the volatile memory such as a buffer that adjusts the writing timing to various caches or to a memory such as a write buffer or a write combine buffer that exist between the processor core and the nonvolatile main memory. Due to this existence, when the processor core writes data by a write command, the order of data arriving at the nonvolatile main memory can be switched, or the data is not immediately written to the nonvolatile main memory but the data can remain in the cache. Thus, in order to ensure the ordering, it is necessary to proceed with the process while the data is being sequentially excluded from the cache by, for example, using a cache flush command. However, since the cache flush command has a large latency, there is a problem in the performance.

In the present embodiment, there is provided means for achieving a high-speed commit process while atomicity and ordering is ensured by connecting the memory controller 100 incorporating the nonvolatile cache memory 10 to the processor 300 via the interconnect 200 such as the QPI.

In the first means, using a cache coherence protocol, the data to be subjected to the commit process (persistent data) is written by an application or the like and immediately thereafter is transferred to the nonvolatile cache memory 10 incorporated in the memory controller 100 at a high speed to be excluded and persisted. Although the more details will be described later, in the present embodiment, by using the property of the cache coherence protocol that controls the states of the cache memories of the processors (processor cores) so as not to be inconsistent, when the processor core performs writing processing (in-place update) directly to the persistent data, the contents of the update is immediately transferred to the memory controller 100, and the transferred updated data is written to the nonvolatile cache memory 10 and persisted.

In the memory controller 100, the memory controller 100 incorporating the nonvolatile cache memory 10 is connected to the processor 300 having a cache by the interconnect that ensures the consistency of both caches by the cache coherence protocol. When the connected processor 300 performs writing to the persistent data, the memory controller 100 transmits, to the processor 300, a request causing a procedure, which is determined by the cache coherence protocol, for transmitting the updated data in order to transfer the written data in the processor 300 to the memory controller 100, and writes and persists the transmitted data to the nonvolatile cache memory 10.

Figure 4:
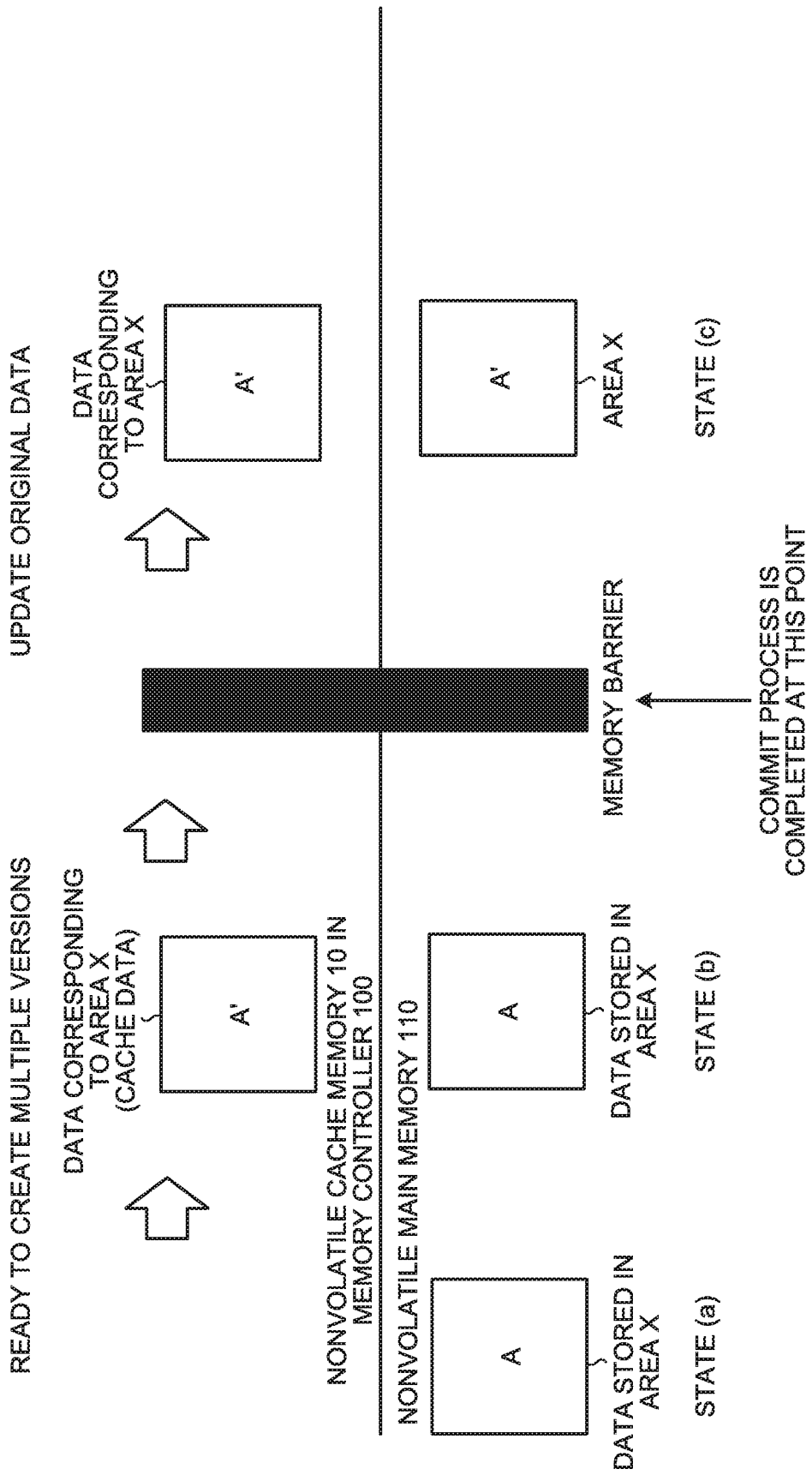
FIG. 4 is a diagram explaining atomicity in an embodiment.
Figure 5:
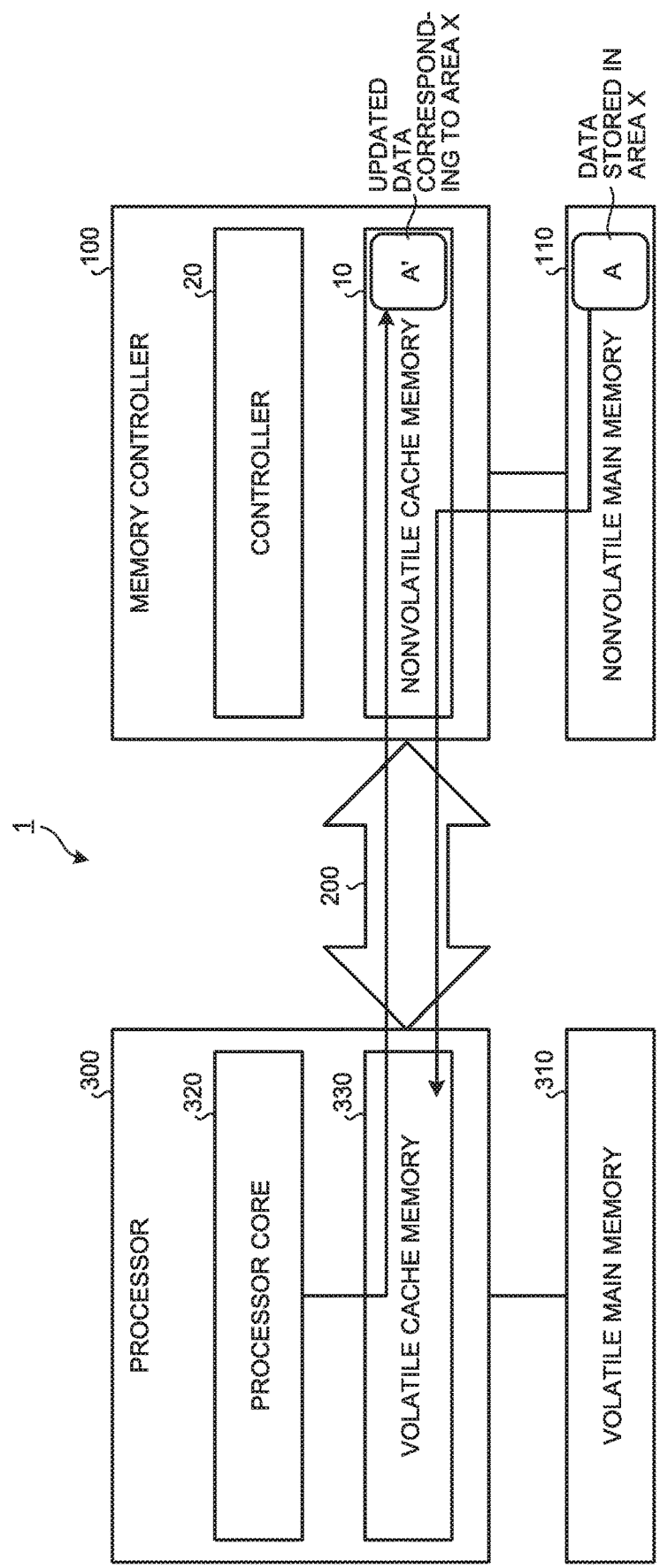
FIG. 5 is a diagram explaining atomicity in an embodiment.

With reference to FIGS. 4 and 5, the atomicity in the present embodiment will be described. The processor core 320 of the processor 300 attempts to perform in-place update to the data (value A) stored in the area (address) X of the nonvolatile main memory 110 without using an explicit multiple version management method. The data (value A) stored in the area X is read from the nonvolatile main memory 110, and transmitted to the processor 300 via the interconnect 200 such as the QPI. Then, when the processor core 320 performs the in-place update to the data, the updated data (value A') is excluded to the memory controller 100 connected to the processor 300 via the interconnect 200 according to the cache coherence protocol. Then, the updated data (value A') is written to the nonvolatile cache memory 10. Since the data (value A) before the update still exists on the nonvolatile main memory 110, it is possible to achieve the state in which both of the data (value A) on the nonvolatile main memory 110 and the data (value A') on the nonvolatile cache memory 10 simultaneously exist at this time as the data corresponding to the area X without explicitly creating multiple versions in another area (address), and to ensure the atomicity. Since multiple versions of the persistent data simultaneously exist on the persistent memory, the commit process is ready to be completed at this point. That is, since the commit process can be completed only by writing the updated data to the high-speed nonvolatile cache memory 10 without writing the data to the nonvolatile main memory 110, it is possible to perform the commit process more quickly.

The second means is for a memory barrier that checks completion of writing of the updated persistent data (in other words, completion of persistence of the updated persistent data) to confirm completion of a commit process in a transaction. As illustrated in FIG. 4, it is necessary to be in a state (c) after execution of a memory barrier in a state (b), and ensuring this order is ensuring the ordering. Generally, although it is recognized that a processor core has performed a write process, the updated data remains in a volatile memory such as a cache or a write buffer between the processor core and a main memory, and it is difficult for the processor core (that is, the application operating on the processor core) to recognize when the updated data is actually written to the main memory. Using the cache coherence protocol, when the processor 300 (application) updates persistent data, the means for immediately excluding the updated data to the nonvolatile cache memory 10 incorporated in the memory controller 100 is provided in the present embodiment, and this means serves as one of the roles of ensuring the ordering. However, in order to ensure the ordering, means for confirming whether the updated data has arrived at the nonvolatile cache memory 10 and whether the actual writing process has been completed is also necessary. Although the more details will be described later, in the present embodiment, by providing means for confirming the completion of the writing process (completion of persistence) of the data excluded by the processor 300 (application) to the memory controller 10 using the cache coherence protocol, the ordering is ensured.

As described above, in the present embodiment, a high-speed commit process is achieved while the atomicity and ordering are ensured by the above two means using the cache coherence protocol. Since the interconnect 200 such as the QPI is designed to connect processors such as the XEON processor, a processor regards the connection destination via the interconnect 200 as a processor similar to itself if the memory controller 100 is connected to the processor via the interconnect 200, and exchanges messages according to the cache coherence protocol. Using this property, one of the features is that the memory controller 100 obtains the updated persistent data and information on the timing to be updated from the processor.

Hereinafter, the details of the present embodiment will be described. As an example, an information processing apparatus 1 illustrated in FIG. 1 will be described. As illustrated in FIG. 1, the information processing apparatus 1 includes a memory controller 100 connected to a nonvolatile main memory 110, and a processor 300 connected to a volatile main memory 310, and which are connected via an interconnect 200. The interconnect 200 ensures a protocol (cache coherence protocol) indicating a procedure for preventing data inconsistency in a plurality of cache memories, and is constituted by, for example, the QPI or the like. The memory controller 100 and the processor 300 may be connected with each other via a bus, a network, or the like.

The processor 300 is, for example, a CPU such as the XEON processor, and operates in accordance with a cache coherence protocol ensured by the interconnect 200. As illustrated in FIG. 1, the processor 300 includes one or more processor cores 320 (only one processor core 320 is illustrated for the sake of description) and a volatile cache memory 330. The processor core 320 reads and writes data from/to the volatile main memory 310 or the nonvolatile main memory 110. The volatile cache memory 330 stores a piece of the data stored in the volatile main memory 310 or the nonvolatile main memory 110.

In this example, one or more processor cores 320 each have a private cache such as an L1 data cache, an L1 command cache, or an L2 cache (not illustrated). The last level cache (LLC), which is the lowest level cache in the cache hierarchy such an L3 cache, is a shared cache shared by the processor cores 320. It is assumed that these are constituted by volatile cache memories such as a static random access memory (SRAM), and these are referred to as the volatile cache memory 330 in this description. The following description is based on the assumption of such a configuration, but the present invention is not limited thereto. A processor 300 further includes a memory controller (not illustrated), such as a DRAM controller, that controls reading and writing of data in accordance with instructions of the processor core 320, and the volatile main memory 310 is connected via the memory controller. The last level cache (LLC) or the like may be a nonvolatile cache.

The volatile main memory 310 is a main memory (main storage apparatus) constituted by a volatile memory such as a DRAM. The main memory connected to the processor 300 may be, for example, a volatile memory other than a DRAM, or a nonvolatile memory such as an MRAM.

As illustrated in FIG. 1, the memory controller 100 includes a nonvolatile cache memory 10 and a controller 20. The nonvolatile cache memory 10 is used for storing a piece of data stored in the nonvolatile main memory 110. The controller 20 controls memory access such as writing and reading of data to/from a nonvolatile cache memory 10. The processor 300 is connected to the nonvolatile main memory 110 via the memory controller 100.

The nonvolatile main memory 110 in the present embodiment is constituted by an MRAM, but is not limited thereto. The nonvolatile main memory 110 may be constituted by, for example, a PCM, a resistive random access memory (ReRAM), a ferroelectric random access memory (FeRAM), a memristor, or the like, or may be a non-volatile DIMM (NVDIMM) in which a DRAM and a NAND Flash are combined. Furthermore, the nonvolatile main memory 110 may be a volatile memory, such as a DRAM, or an SRAM, which is backed up by a battery (power supply from the battery is continued when the power is off).

After detecting that the processor 300 has updated data corresponding to any area of the nonvolatile main memory 110 using the cache coherence protocol ensured by the interconnect 200, the controller 20 causes the updated data to be transmitted to the memory controller 100, and writes the updated data to the nonvolatile cache memory 10.

More specifically, after receiving a first request for requesting data corresponding to any area of the nonvolatile main memory 110 from the processor 300, the controller 20 transmits a first response message containing the data corresponding to the area and information indicating that the data has been held in the nonvolatile cache memory 10 to the processor 300 via the interconnect 200. When receiving a second request for requesting to invalidate the cache line corresponding to the area from a processor 300 after transmitting the first response message, the controller 20 detects that the processor 300 (application) has updated the data corresponding to the area. Note that, a cache line is unit information held in the cache memory, and a cache line corresponding to a specific area on the nonvolatile main memory 110 is a copy of the data corresponding to the specific area. Here, when the data corresponding to any area of the nonvolatile main memory 110 and requested by the first request is not held in the nonvolatile cache memory 10, the controller 20 transmits, to the processor 300, the first response message containing the data read from the area of the nonvolatile main memory 110 and the information indicating that the data has been held in the nonvolatile cache memory 10.

After receiving the second request, the controller 20 does not perform the process for invalidating the cache line corresponding to the area, but transmits, to the processor 300 via the interconnect 200, a second response message for informing that the cache line corresponding to the area has been invalidated as the response to the second request. Then, after sending the second response message, the controller 20 transmits a third request for requesting the data corresponding to the area to the processor 300 via the interconnect 200, and receives the data updated by the processor 300 in response to the third request. Then, the controller 20 writes the received updated data to the nonvolatile cache memory 10. Here, the third request is information for requesting the data corresponding to the area in order to update the data corresponding to the area updated by the processor 300. The third request also corresponds to information to be transmitted when a second processor, if connected to the processor 300 in place of the memory controller 100, fails to refer to the data corresponding to the area (failure in writing or reading). The controller 20 does not update the received updated data as the response to the third request. In short, the controller 20 transmits, to the processor 300, the third request causing the procedure for transmitting the updated data, and writes the data transmitted as the response to the third request to the nonvolatile cache memory 10. The procedure for transmitting the updated data is determined by the protocol (cache coherence protocol) ensured by the interconnect 200 to transfer the updated data in the processor 300 to the memory controller 100. The details of the above operation example will be described later.

Here, the cache coherence protocol ensured by the interconnect 200 connecting the processor 300 to the memory controller 100 is a cache coherence protocol such as a QPI protocol ensured by the QPI or an MESIF protocol, but is not limited thereto, and may be, for example, an MSI protocol, an MESI protocol, an MOESI protocol, or an MESIF protocol itself, or an arbitrary protocol in which such a protocol is extended or changed. The cache coherence protocol may be, for example, a protocol in which the Owned state of the MOESI protocol is added to the MESIF protocol. This also applies to other embodiments. For example, a unique memory controller 100 may be designed and mounted using an existing XEON processor and the QPI, and connected via the QPI. In the cache coherence protocol such as the QPI protocol or the MESIF protocol supported by the interconnect 200 in the present embodiment, the states of the cache line such as a Modified state, an Exclusive state, a Shared state, an Invalid state, and a Forward state are provided, and the basic operation conforms to the QPI protocol or the MESIF protocol. The details thereof will be described as needed in the following detailed operation examples.

An example in which the information processing apparatus 1 having the above configuration implicitly creates multiple versions of the persistent data in FIG. 4 by in-place update and performs the commit process will be described. First, as a preparatory step, a home node (a CPU is arranged in the case of, for example, the XEON processor system) that stores and manages persistent data is arranged so as to be a node to which the memory controller 100 is connected. This can be set by a program by, for example, using an application program interface (API) for designating the number of the home node that manages the persistent data. As illustrated in, for example, FIG. 3, due to the system configuration of the information processing apparatus, in the case in which the memory controller 100 is arranged at a position where the second processor 500 can exist and the node is set as the home node, the API may designate the home node number "2" as the argument for securing the memory when the area (memory) in which the persistent data is stored is secured. As a result, as illustrated in FIG. 5, the persistent data is allocated in the area X of the nonvolatile main memory 110. In short, the information processing apparatus 1 in the present embodiment is only required to have a setting unit that sets a main memory to which persistent data is allocated. The API is an example of the setting unit. Alternatively, when a dedicated function for securing a memory for storing persistent data is used, the persistent data may be automatically allocated in the area X of the nonvolatile main memory 110 as illustrated in FIG. 5.

Figure 6:
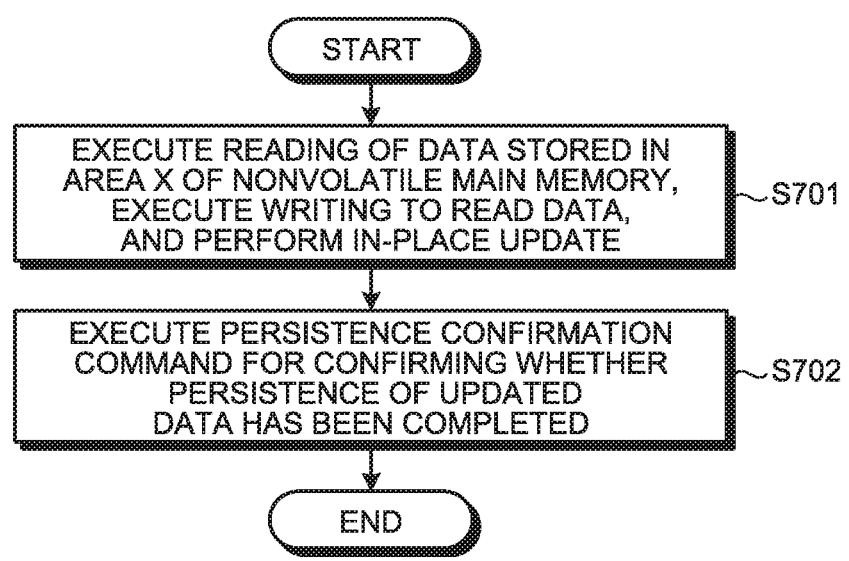
FIG. 6 is a diagram illustrating an example of a process for updating persistent data in the first embodiment.

FIG. 6 is a diagram illustrating an example of a process of the application for updating (persisting) the data corresponding to the area X of the nonvolatile main memory 110. First, the processor core 320 (application) reads the data (data indicating the value A in this example) stored in the area X of the nonvolatile main memory 110 by a read command, caches the data in the volatile cache memory 330, and writes the value A' to the cache line (first cache line) by a write command to perform in-place update (step S701). The updated data (value A') written to the volatile cache memory 330 of the processor 300 is immediately excluded to the nonvolatile cache memory 10 without remaining in the volatile cache memory 330 by "means for quickly excluding and persisting persistent data to the nonvolatile cache memory 10" to be described later. Then, the processor core 320 (application) executes a persistence confirmation command for confirming whether an external apparatus (the memory controller 100 in this example) connected via the interconnect 200 has completed the persistence of the updated data (step S702). Execution of the command enables the processor 300 (application) to detect (confirm) that the external apparatus (the memory controller 100 in this example) has completed the persistence of the updated data by "means for confirming the completion of persistence of persistent data". Hereinafter, the detailed operations of the "means for quickly excluding and persisting persistent data to the nonvolatile cache memory 10" and the "means for confirming completion of persistence of persistent data" will be described.

First, an example of a procedure for persisting persistent data by the "means for quickly excluding and persisting persistent data to the nonvolatile cache memory 10" will be described. As shown in step S1 in FIG. 7, first, in order to update the data (value A) stored in the area X of the nonvolatile main memory 110, the processor core 320 reads the data (value A) stored in the area X, and stores the data in the volatile cache memory 330. Hereinafter, the cache line corresponding to the area X of the nonvolatile main memory 110 in the cache lines of the volatile cache memory 330 may be referred to as a "first cache line". Next, as shown in step S2 in FIG. 7, the processor core 320 writes the value A' to the first cache line by the write command, and performs the in-place update to the data of the first cache line (data corresponding to the area X). Next, as shown in step S3 in FIG. 7, when the memory controller 100 operates as if performing writing to the cache line corresponding to the area X of the nonvolatile main memory 110 (which may be referred to as a "second cache line") in the cache lines of the nonvolatile cache memory 10 (actually does not perform the writing) (step S3-1), the processor 300 excludes the updated data to the memory controller 100 (step S3-2). Then, the memory controller 100 writes the updated data (data corresponding to the area X) received from the processor 300 to the nonvolatile cache memory 10.

Figure 7:
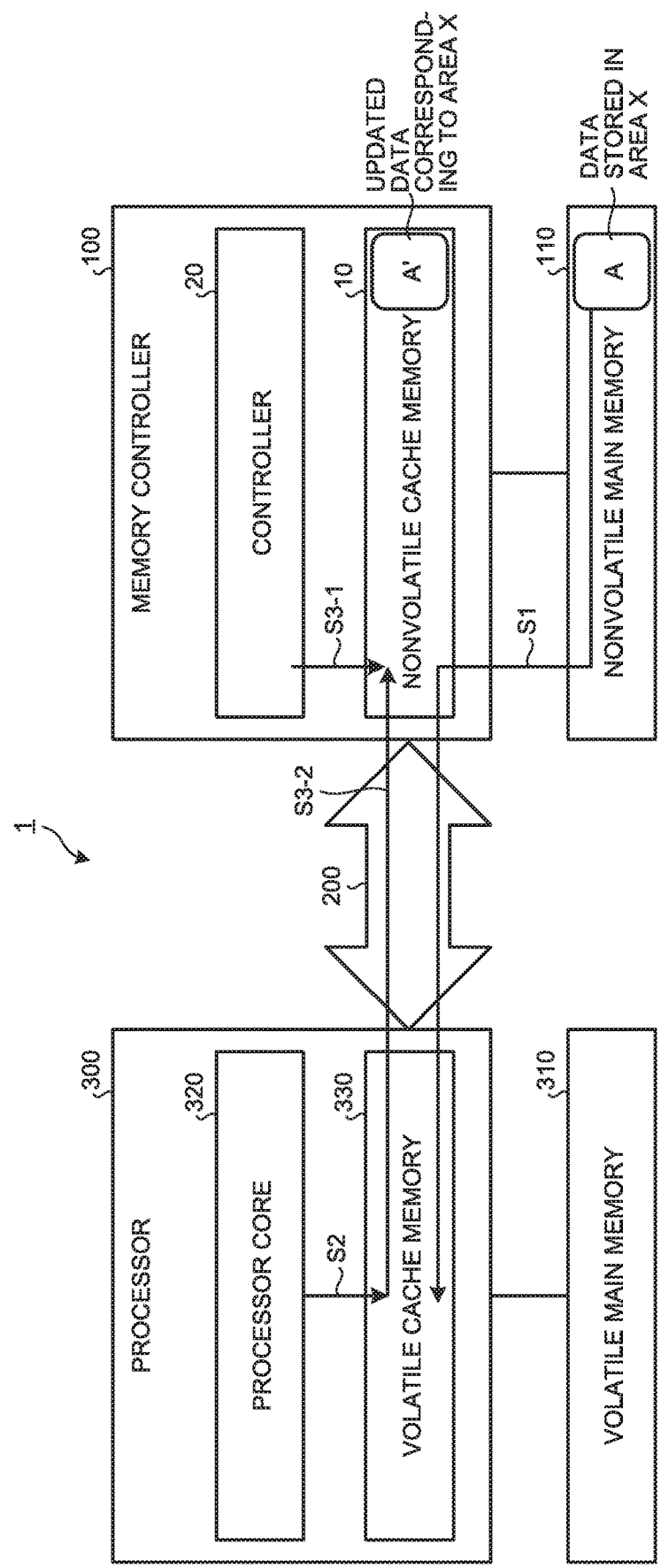
FIG. 7 is a diagram illustrating an example of a procedure in which persistent data is persisted in the first embodiment.
Figure 8:
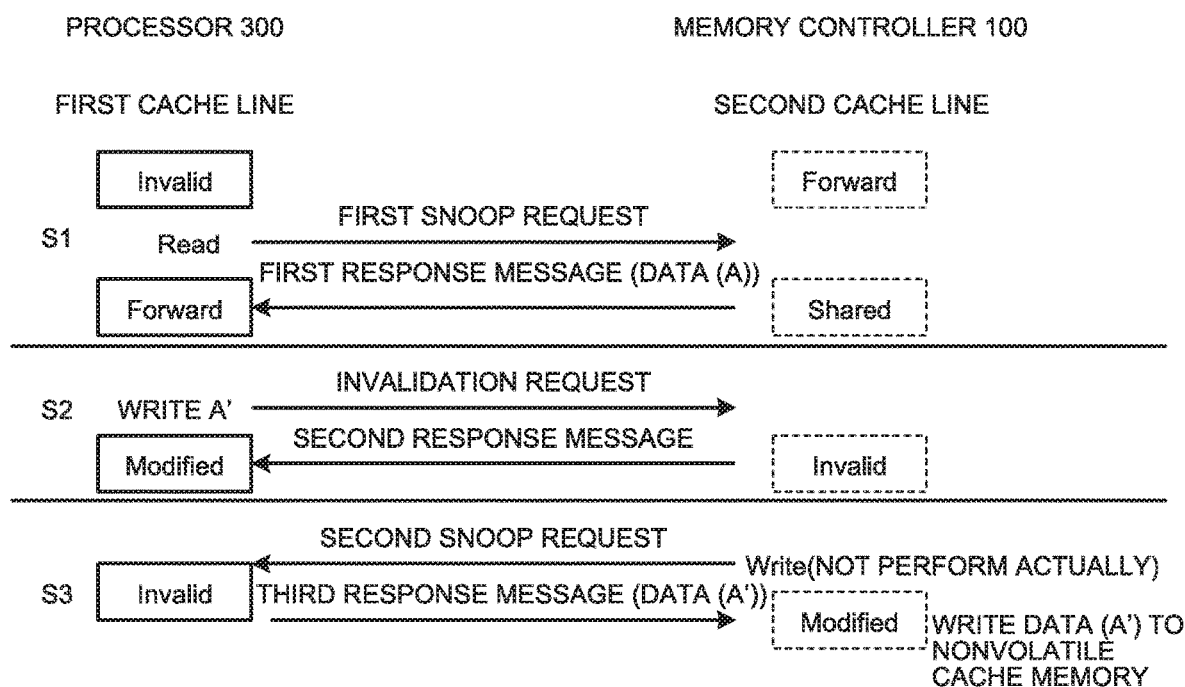
FIG. 8 is a diagram illustrating the details of the procedure in which persistent data is persisted in the first embodiment.

FIG. 8 is a diagram illustrating an example of a detailed procedure of the steps (S1 to S3) in FIG. 7. First, the details corresponding to step S1 will be described. First, when the processor core 320 designates the address of the area X of the nonvolatile main memory 110 and executes a read command to read the data stored in the area X, the volatile cache memory 330 in this example is in the Invalid state in which the cache line corresponding to the area X is not cached, and a cache miss occurs. Thus, a first snoop request due to the cache miss (information for requesting the data corresponding to the area X) is transmitted to the home node having the address of the area X. The first snoop request corresponds to the above first request. In this example, the memory controller 100 in the present embodiment is connected to the position of the home node instead of the processor, and the first snoop request arrives at the memory controller 100 (also arrives at other processors in the case of there exist the other processors).

At this time, if a second processor that operates according to the cache coherence protocol exists instead of the memory controller 100 and when the second processor does not cache the cache line corresponding to the area X, the second processor reads, from the nonvolatile main memory 110, the cache line containing the data (value A) stored in the area X of the nonvolatile main memory 110 and transfers the data to the processor 300 via the interconnect 200. Then, the processor 300 stores the transferred cache line (cache line corresponding to the area X) in the volatile cache memory (last level cache) 330. Then, the processor 300 is in the Exclusive state in which the cache line corresponding to the area X (first cache line) is not changed from when the contents of the cache line is read from the nonvolatile main memory 110 and the cache line having the same address is not stored in any cache memory of the other processors.

For the reason to be described later, the purpose of the present embodiment is to enable the memory controller 100 to control the first cache line of the processor 300 so as to be in the Shared state in which the cache line corresponding to the area X is cached also by the other processors, or in the Forward state in which the cache line corresponding to the area X is cached also by the other processors and transferring a copy is the only response when the cache line corresponding to the area X is requested. Thus, when the first snoop request arrives, the controller 20 of the memory controller 100 operates as if being in the Exclusive state in which the cache line corresponding to the area X is cached exclusively or in the Forward state, and returns, to the processor 300, the first response message containing the cache line corresponding to the area X (including the data (value A) stored in the area X of the nonvolatile main memory 110) and the information indicating that the data (cache line) corresponding to the area X is cached. In this example, since the cache line corresponding to the area X is not actually cached in the nonvolatile cache memory 10 of the memory controller 100, the controller 20 reads the data stored in the area X of the nonvolatile main memory 110, caches (may not cache) the data in the nonvolatile cache memory 10, and returns, to the processor 300, the first response message containing the data read from the area X and the information indicating that the data corresponding to the area X is cached (also in the case where the data is not actually cached).

When receiving the first response message, the processor 300 determines that the processor (second processor) connected via the interconnect 200 holds the cache line corresponding to the area X, and holds the cache line contained in the first response message in the volatile cache memory 330 as the first cache line. Thus, the processor core 320 can read the data (value A) stored in the area X. At this stage, the first cache line of the processor 300 is in the Forward state, and the processor 300 recognizes that the processor (second processor) connected via the interconnect 200 exists (actually the memory controller 100 exists) and that the cache line (the second cache line) corresponding to the area X in the cache lines of the second processor is in the Shared state.

Next, the details corresponding to step S2 will be described. First, the processor core 320 writes the data corresponding to the area X by a write command (designates the address of the area X and executes the write command). Since the cache line (first cache line) corresponding to the area X exists in the volatile cache memory 330, the value A' is to be written to the first cache line. Here, since the first cache line is in the Forward state and it is necessary to invalidate the cache lines (the cache line corresponding to the area X) having the same address in the other processors, the processor 300 broadcasts, to the other processors, an invalidation request for requesting to invalidate the cache line corresponding to area X based on the cache coherence protocol. The invalidation request corresponds to the above second request. The reason that the memory controller 100 controls the first cache line to be in the Forward state is to cause the invalidation request. That is, by issuing the invalidation request, the memory controller 100 can recognize that a write command for updating the data corresponding to the area X is executed. If the second processor that operates according to the cache coherence protocol exists instead of the memory controller 100, when receiving the invalidation request, the second processor is required to perform an invalidate process to the cache line according to the request. However, in the present embodiment, the invalidation request is intentionally issued by the memory controller 100 using the cache coherence protocol in order for the memory controller 100 to recognize the timing of updating the data corresponding to the area X, and the memory controller 100 does not necessarily perform the invalidate process actually. Thus, when receiving the invalidation request, the controller 20 of the memory controller 100 does not perform the invalidate process, but returns the second response message for informing the invalidation to the processor 300 so as to operate as if the cache line corresponding to the area X has been invalidated according to the cache coherence protocol as the response to the invalidation request. At this stage, the memory controller 100 has been able to recognize the timing of updating the data corresponding to the area X. When receiving the second response message as the response to the invalidation request, the processor 300 determines that the cache lines (the cache line corresponding to the area X) having the same address in the other processors has been invalidated, performs an actual write process to the first cache line, and changes the state of the first cache line to the Modified state.

Next, the details corresponding to step S3 will be described. After returning the second response message as the response to the invalidation request, if the second processor exists instead of the memory controller 100, the controller 20 of the memory controller 100 transmits a second snoop request due to the failure in writing (information for requesting the data corresponding to the area X) which is transmitted when the second processor fails to perform the writing to the second cache line. This is to immediately draw the data corresponding to the area X updated by the processor 300 in step S2 to the memory controller 100 via the interconnect 200. The second snoop request corresponds to the above third request.

When receiving the second snoop request, the processor 300 transmits a third response message containing the updated data (value A') of the first cache line as the response to the second snoop request, and changes the state of the first cache line to the Invalid state. If the second processor exists instead of the memory controller 100, when receiving the third response message as the response to the second snoop request, the second processor updates the contents of the nonvolatile main memory 110 with the data (value A') contained in the third response message. However, the memory controller 100 intentionally issues the second snoop request to immediately draw the data corresponding to the area X updated by the processor 300 to the memory controller 100 via the interconnect 200, and does not update the contents of the nonvolatile main memory 110 with the updated data (value A') contained in the third response message (the failure in writing has been caused but the writing itself is not performed). In the first place, if updating is performed, multiple versions of the data corresponding to the area X cannot be created. Here, since the data contained in the third response message is the update content of the data corresponding to the area X, the controller 20 of the memory controller 100 writes the data to the nonvolatile cache memory 10. More specifically, for example, the data is written to the area in which the second cache line is held in the nonvolatile cache memory 10 (the area corresponding to the area X in the nonvolatile cache memory 10). As a result, the data corresponding to the area X updated by the processor 300 has been written in the nonvolatile cache. Thus, as illustrated in FIG. 7, the old version indicating the value A and the latest version indicating the value A' exist as the data corresponding to the area X, and the commit process is ready to be completed. The information processing apparatus 1 in the present embodiment reads and updates first data (for example, the data (value A) stored in the area X) on the nonvolatile main memory 110 to the processor 300, and completes the commit process for persisting the data at the time when the updated data (value A') is stored in the nonvolatile cache memory 10 as second data.

Figure 9:
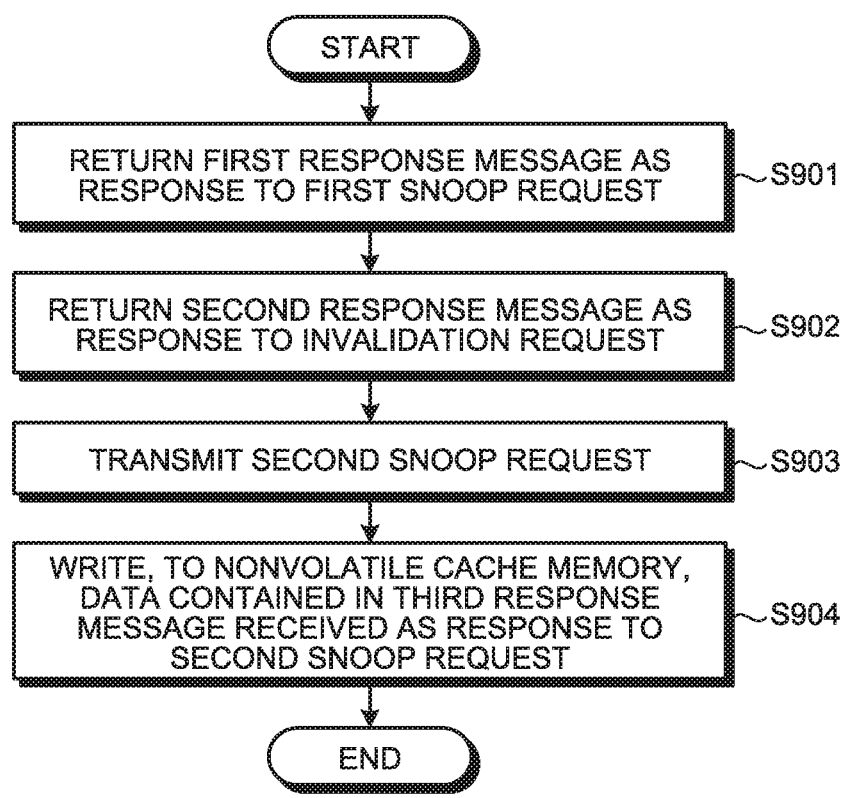
FIG. 9 is a diagram illustrating an operation example of a memory controller in the first embodiment.

FIG. 9 is a flowchart of an operation example of the controller 20 of the above memory controller 100. When receiving the above first snoop request from the processor 300, the controller 20 transmits the first response message as the response to the first snoop request to cause the processor to issue the invalidation request (step S901). Next, when receiving the above invalidation request from the processor 300, the controller 20 detects that the processor 300 has updated the data requested by the above first snoop request. Then, the controller 20 does not actually perform the invalidate process, but transmits the above second response message as the response to the invalidation request (step S902). Next, the controller 20 transmits the above second snoop request to the processor 300 to immediately draw the updated data to the memory controller 100 (step S903). Next, the controller 20 writes, to the nonvolatile cache memory 10, the data (the data corresponding to the area X updated by the processor 300) contained in the third response message received as the response to the second snoop request (step S904).

Figure 10:
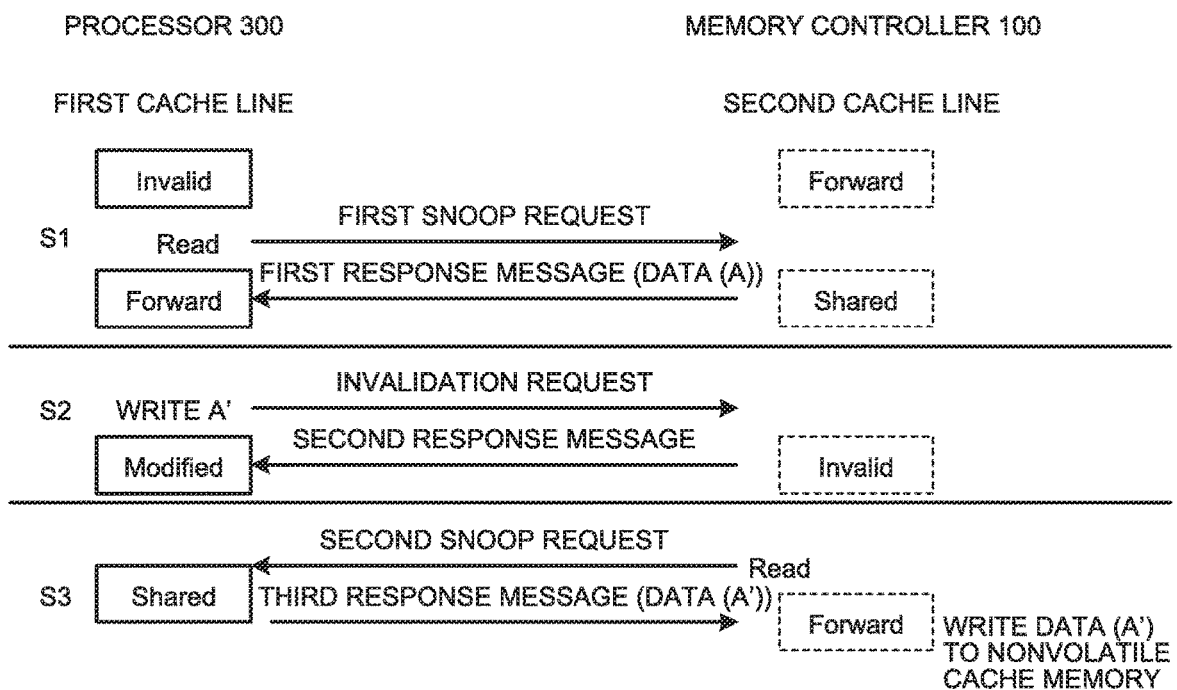
FIG. 10 is a diagram illustrating an example of a procedure in which persistent data is persisted in the modified example.

As illustrated in FIG. 10, instead of transmitting the second snoop request due to the failure in writing in step S3, the second snoop request may be transmitted due to the failure in reading.

Figure 11:
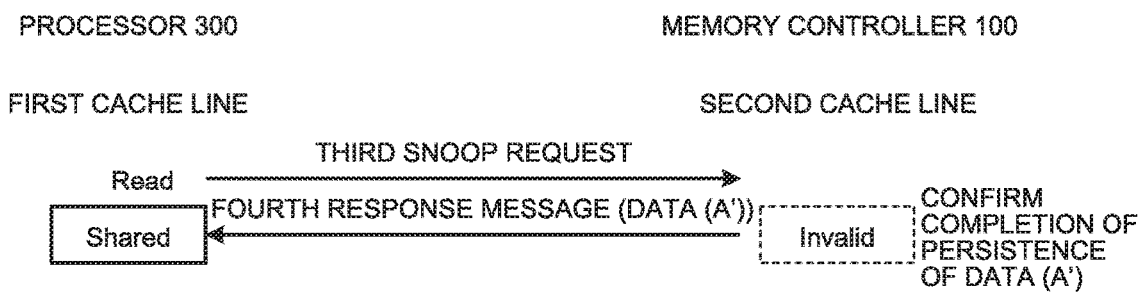
FIG. 11 is a diagram illustrating an example of a procedure for confirming completion of persistence of persistent data in the first embodiment.

Next, an example of a procedure for confirming completion of persistence of persistent data will be described by the "means for confirming completion of persistence of persistent data". After transmitting the third response message as the response to the above second snoop request, the processor 300 transmits a third snoop request due to a failure in reading (information for requesting the data (cache line) corresponding to area X), which is transmitted when reading from the first cache line has failed as illustrated in FIG. 11. Here, since the first cache line is in the Invalid state as described above, the third snoop request is issued, and the issued third snoop request arrives at the memory controller 100 via the interconnect 200. When receiving the third snoop request, the memory controller 100 transmits a fourth response message containing the data indicating the value A' as the response to the third snoop request after the writing of the data (value A') contained in the third response message to the nonvolatile cache memory 10 has been completed (that is, after the persistence has been completed). When the processor 300 receives the fourth response message, the first cache line becomes, for example, in the Shared state. Then, when the reading of the data indicating the value A' is completed, that the memory controller 100 has completed the persistence of the persistent data is ensured, and the commit process can be completed.

In short, the processor 300 in the present embodiment transmits, in order to refer to data corresponding to any area X of the nonvolatile main memory 110 and updated by the processor 300, the data corresponding to the area X in the data stored in the cache memory (the volatile cache memory 330 in this example) as the response based on the protocol (the cache coherence protocol ensured by the interconnect 200) to the third request (the above second snoop request in this example) from the external apparatus (the memory controller 100 in this example) connected via the interconnect 200 for requesting the data corresponding to the area X of the nonvolatile main memory 110. Then, the processor 300 transmits a confirmation request for confirming that persistence of the transmitted data has been completed to the external apparatus, and confirms that the persistence of the transmitted data has been completed based on the response to the confirmation request. Here, as an example of the confirmation request, the above third snoop request is exemplified, but the present invention is not limited thereto.

In addition, the Intel's PCOMMIT command for confirming persistence of memory writing disclosed in the non-patent document "Intel Architecture Instruction Set Extensions Programming Reference (319433-022, OCTOBER 2014) CHAPTER 11: MEMORY INSTRUCTIONS" can be implemented in the present embodiment by a method as illustrated in FIG. 11

Figure 12:
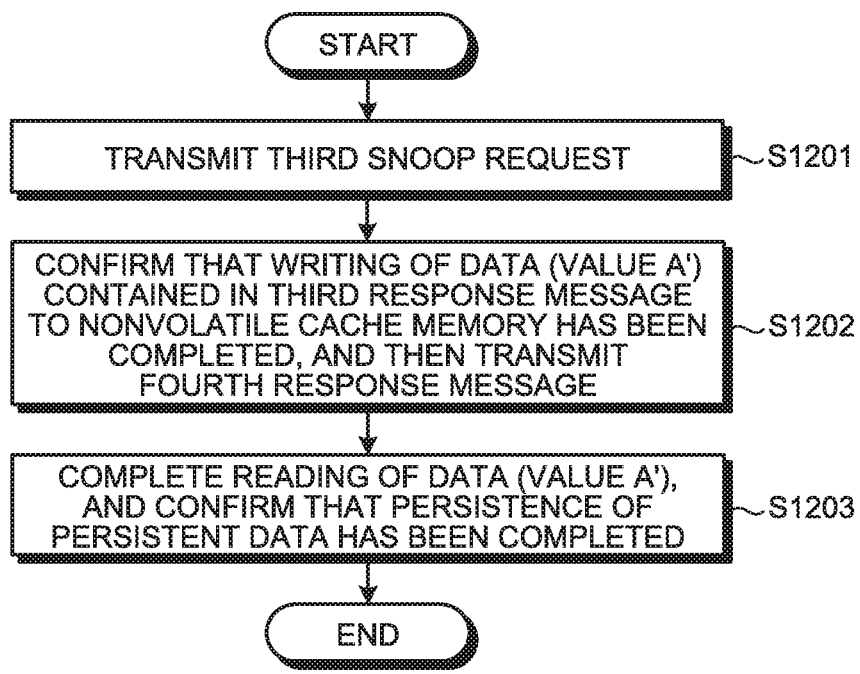
FIG. 12 is a diagram illustrating an operation example of the information processing apparatus in the first embodiment.

FIG. 12 is a flowchart showing an operation example of the information processing apparatus 1 when the completion of the persistence of the persistent data is confirmed. In response to the above second snoop request, the processor 300 transmits the above third response message, and then transmits the above third snoop request to the memory controller 100 via the interconnect 200 (step S1201). Next, when receiving the third snoop request, the controller 20 of the memory controller 100 confirms that the writing, to the nonvolatile cache memory 10, of the data (value A') contained in the third response message received from the processor 300 before receiving the third snoop request has been completed, and then transmits the above fourth response message to the processor 300 via the interconnect 200 (step S1202). When receiving the fourth response message, the processor 300 completes the reading of the data (value A') from the first cache line which is ready to be read, and then confirms that the persistence of the data excluded from volatile cache memory 330 to the memory controller 100 (the above data contained in the third response message) has been completed (step S1203).

As another means for confirming completion of persistence of persistent data, by waiting for a certain period of time, for example, some cycles to dozens of cycles after transmitting the third response message as the response to the above second snoop request, it is also possible to confirm that the writing to the nonvolatile cache memory 10 has been completed. That is, it may be confirmed that the writing to the nonvolatile cache memory 10 has been completed when a certain period of time passes after the third response message is transmitted. The certain period of time is longer than the sum of the time required for transmitting the data from the processor 300 to the memory controller 100 and the time required for the memory controller 100 to complete the writing (persistence) of the data to the nonvolatile cache memory 10. This time is a value determined in advance at the time of measuring, designing, or the like, and provided to an application or the like. This method can be similarly applied to the second embodiment to be described later. The above PCOMMIT command may be implemented by this method, and the same applies to the second embodiment to be described later.

As described above, the memory controller 100 in the present embodiment is connected to the processor 300 via the interconnect 200 that ensures the cache coherence protocol indicating the procedure for preventing data inconsistency in a plurality of cache memories. Then, after detecting that the processor 300 has updated the data corresponding to any area X of the nonvolatile main memory 110 connected to the memory controller 100 using the cache coherence protocol ensured by the interconnect 200, the controller 20 of the memory controller 100 causes the updated data to be transmitted to the memory controller 100, and writes the updated data received from the processor 300 to the nonvolatile cache memory 10. Since the data before the update still exists on the nonvolatile main memory 110, it is possible to achieve the state in which both of the data on the nonvolatile main memory 110 and the data on the nonvolatile cache memory 10 simultaneously exist at this time as the data corresponding to the area X without explicitly creating multiple versions, and to ensure the atomicity. Furthermore, since the commit process can be completed only by writing the updated data to the nonvolatile cache memory 10 without writing the data to the nonvolatile main memory 110, it is possible to perform the commit process more quickly.

As described above, the processor 300 in the present embodiment transmits, in order to refer to the data corresponding to the area X of the nonvolatile main memory 110 and updated by the processor 300, the data corresponding to the area X in the data stored in the volatile cache memory 330 (the third response message in this example) as the response based on the protocol to the third request (the above second snoop request in this example) from the memory controller 100 for requesting the data corresponding to the area X. Then, the processor 300 transmits a confirmation request (the above third snoop request in this example) for confirming that persistence of the transmitted data has been completed, and confirms that the persistence of the transmitted data has been completed based on the response to the confirmation request.

That is, in the present embodiment, when the processor 300 updates the persistent data, by providing the means for immediately excluding the updated data to the nonvolatile cache memory 10 incorporated in the memory controller 100, and the means for confirming, by processor 300, that the persistence of the data (updated data) excluded to the memory controller 100 has been completed using the cache coherence protocol, the ordering is ensured.

As described above, according to the present embodiment, it is possible to achieve a high-speed commit process while the atomicity and ordering are ensured. Thus, it is possible to achieve a high-performance and high-reliability data persistence processing method.

In the above present embodiment, a cache line is used as a unit for maintaining coherence, but the unit is not limited thereto, and may be an arbitrary granularity such as a page unit of the OS or a block unit. It is obvious that the processor 300 is not limited to the CPU, but may be an accelerator such as a GPU. This also applies to the second embodiment to be described later.

Second Embodiment

Figure 13:
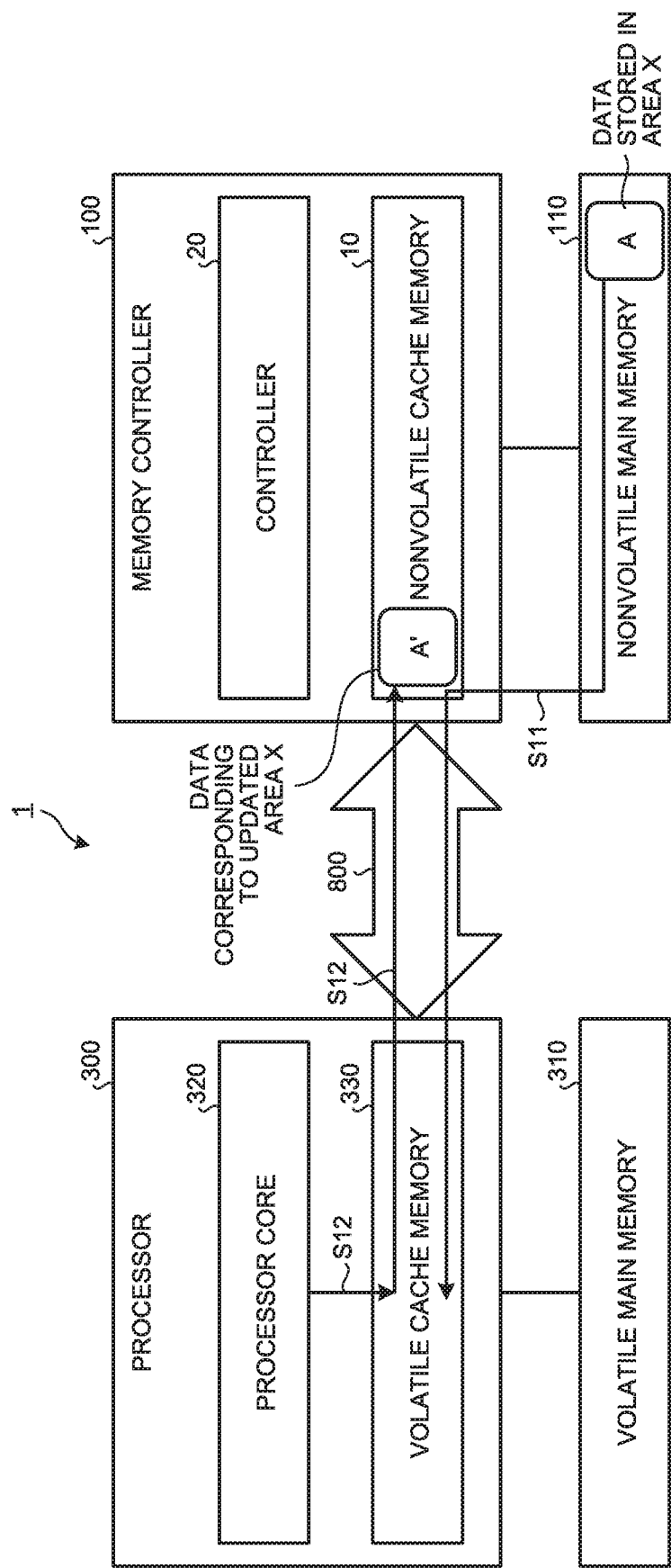
FIG. 13 is a diagram illustrating an example of a procedure in which persistent data is persisted in an second embodiment.

Next, a second embodiment will be described. The description common to the above first embodiment will be appropriately omitted. In the present embodiment, as illustrated in FIG. 13, a processor 300 and a memory controller 100 are different from those in the first embodiment in that the processor 300 and the memory controller 100 are connected with each other via an interconnect 800 that ensures a cache coherence protocol optimized for a commit process and different from the existing cache coherence protocol (hereinafter, referred to as an "optimized protocol"). The interconnect 800 ensures the optimized protocol for maintaining consistency between a volatile cache memory 330 of the processor 300 and a nonvolatile cache memory 10 of the memory controller 100. The basic configurations of the processor 300 and the memory controller 100 are similar to those in the first embodiment, but the processor 300 and the memory controller 100 operate according to the optimized protocol.

In the present embodiment, there are provided "means for quickly excluding and persisting persistent data to the nonvolatile cache memory 10" and "means for confirming completion of persistence of persistent data" using the optimized protocol similarly to the above first embodiment.

First, an example of a procedure for persisting persistent data by the "means for quickly excluding and persisting persistent data to the nonvolatile cache memory 10" will be described. As shown in step S11 in FIG. 13, first, in order to update the data (value A) stored in the area X of a nonvolatile main memory 110, the processor 300 reads the data stored in the area X, and stores the data in the volatile cache memory 330. The details are as follows. First, when a processor core 320 designates the address of the area X of the nonvolatile main memory 110 and executes a read command to read the data (value A) stored in the area X, the volatile cache memory 330 in this example is in the Invalid state in which the cache line corresponding to the area X is not cached, a cache miss occurs. Thus, a fourth request for requesting the data corresponding to the area X is transmitted to the home node (the memory controller 100 in this example) having the address of the area X. When receiving the fourth request, the controller 20 of the memory controller 100 reads the data (value A) stored in the area X of the nonvolatile main memory 110 and caches the data in the nonvolatile cache memory 10 (caches a second cache line). In this example, although the data is cached, but may not be cached. Then, the controller 20 returns, to the processor 300, a fifth response message containing the cache line corresponding to the area X (the contents of the second cache line containing the data (value A) read from the area X) as the response to the fourth request. When receiving the fifth response message, the processor core 320 of the processor 300 holds the cache line contained in the fifth response message in the volatile cache memory 330 as a first cache line. Thus, the processor core 320 can read the data (value A) stored in the area X. At the end of the step S11, the first cache line is in a state for transferring the contents written to the home node when next writing for persistence is performed (FORWARD TO HOMENODE). Note that, data which is not necessary to be persisted does not need to be in the state for transferring the written contents, and is in a general state (a state in which transferring is not necessary) such as the Exclusive state in which the contents of the cache line are not changed from when it is read from the main memory.

Next, as shown in step S12 in FIG. 13, the processor 300 (application) writes the value A' to the first cache line by a write command, performs in-place update to the data stored in the first cache line, and excludes the updated data to the memory controller 100. The details are as follows. First, the processor core 320 writes the data corresponding to the area X by a write command (designates the address of the area X and executes the write command). Since the cache line (first cache line) corresponding to the area X exists in the volatile cache memory 330, the value A' is to be written to the first cache line. In this case, since the first cache line is in the state of "FORWARD TO HOMENODE", the contents written to the first cache line are immediately transferred from the volatile cache memory 330 to the memory controller 100. After the transfer, the first cache line is in the Invalid state. Then, the controller 20 of the memory controller 100 writes the updated data received from the processor 300 to the nonvolatile cache memory 10. More specifically, the controller 20 writes and reflects the copy of the updated first cache line received from the processor 300 to the second cache line. At this time, the nonvolatile main memory 110 is not updated. Thus, the old version indicating the value A and the latest version indicating the value A' simultaneously exist as the data corresponding to the area X, and the commit process is ready to be completed.

Figure 14:
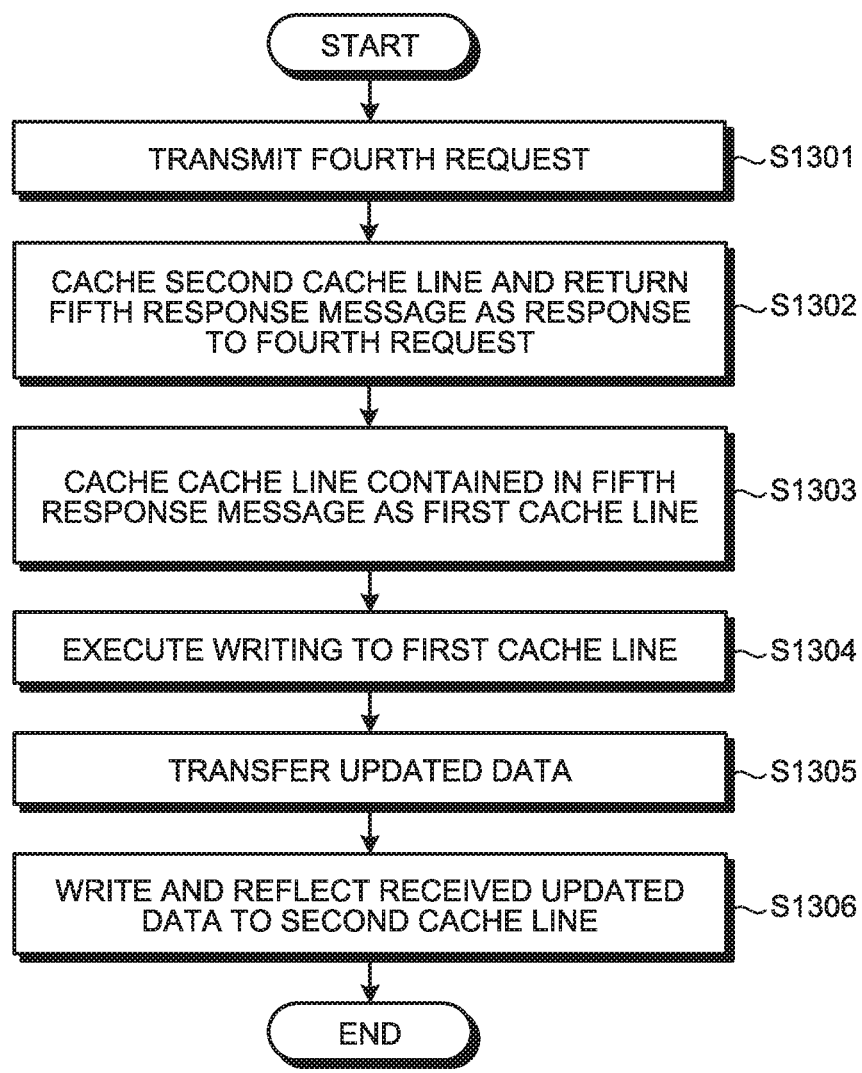
FIG. 14 is a diagram illustrating an operation example of an information processing apparatus in the second embodiment.

FIG. 14 is a flowchart showing an operation example of the above information processing apparatus 1. The details of each step are as described above. First, the processor core 320 of the processor 300 transmits the above fourth request to the memory controller 100 via the interconnect 800 (step S1301). Next, when receiving the fourth request, the controller 20 of the memory controller 100 caches the second cache line and returns the above fifth response message as the response to the fourth request (step S1302). Next, when receiving the fifth response message, the processor core 320 of the processor 300 caches the cache line (contents of the second cache line) contained in the fifth response message as the first cache line (step S1303). Next, the processor core 320 executes writing to the first cache line (step S1304) and transfers the updated data (copy of the updated first cache line) to the memory controller 100 via the interconnect 800 (Step S1305). Next, the controller 20 of the memory controller 100 writes and reflects the updated data received from the processor 300 via the interconnect 800 to the second cache line (step S1306).

In short, in the present embodiment, the processor 300 and the memory controller 100 are connected with each other via an interconnect 800 that ensures the above optimized protocol. When the processor 300 updates data corresponding to any area X of the nonvolatile main memory 110, the updated data is transferred to the memory controller 100 in accordance with the above optimized protocol, and the controller 20 writes the updated data received from the processor 300 to the nonvolatile cache memory 10.

Next, an example of a procedure for confirming completion of persistence of persistent data will be described by the "means for confirming completion of persistence of persistent data". After transferring, to the memory controller 100, the contents written to the first cache line in the above manner, the processor core 320 (application) transmits a confirmation request for confirming the completion of the persistence of the transferred data to the memory controller 100 via the interconnect 800, and confirms that the persistence of the transferred data has been completed based on the response to the confirmation request. In this example, after transferring, to the memory controller 100, the contents written to the first cache line, the processor core 320 attempts to perform reading from the first cache line but fails in the reading, and transmits a fifth request (information for requesting the data (cache line) corresponding to the area X) which is transmitted at the time of the failure in reading. Here, since the first cache line is in the Invalid state as described above, the fifth request is issued, and the issued fifth request arrives at the memory controller 100 via the interconnect 800. When receiving the fifth request, the memory controller 100 transmits a sixth response message containing the data indicating the value A' as the response to the fifth request after the writing, to the nonvolatile cache memory 10, of the updated data (value A') corresponding to the area X received from the processor 300 before receiving the fifth request has been completed (that is, after the persistence has been completed). When the processor 300 receives the sixth response message, the first cache line becomes ready to be read. Then, when the reading of the data indicating the value A' is completed, that the memory controller 100 has completed the persistence of the persistent data is ensured, and the commit process can be completed. In this example, the area X is used for confirmation of persistence, but the present invention is not limited thereto, and an area different from the area X may be used for confirmation for example. In this case, it is unnecessary for the first cache line in which the contents written to the first cache line has been transferred to the memory controller 100 to be in the Invalid state.

FIG. 15 is a flowchart showing an operation example of the information processing apparatus 1 when the completion of the persistence of the persistent data is confirmed. After transferring the contents written to the first cache line to the memory controller 100 in the above manner, the processor 300 transmits the fifth request to the memory controller 100 via the interconnect 800 (step S1401). Next, when receiving the fifth request, the controller 20 of the memory controller 100 confirms that the writing, to the nonvolatile cache memory 10, of the updated data (value A') corresponding to the area X received from the processor 300 before receiving the fifth request has been completed, and then transmits the above sixth response message to the processor 300 via the interconnect 800 (step S1402). When receiving the sixth response message, the processor 300 completes the reading of the data (value A') from the first cache line which is ready to be read, and then confirms that the persistence of the data excluded from volatile cache memory 330 to the memory controller 100 (the data corresponding to the updated area X) has been completed (step S1403). As another method for confirming the completion of the persistence of the persistent data, as described in the first embodiment, after transferring the contents written to the first cache line to the memory controller 100, by waiting a certain period of time instead of transmitting the above fifth request, the persistence may be confirmed.

The above Intel PCOMMIT command may also be implemented in this way.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A memory controller comprising:
a nonvolatile cache memory configured to store a piece of data stored in a nonvolatile main memory connected to the memory controller; and
a controller configured to control writing of data to the nonvolatile cache memory, wherein
the memory controller is connected to a processor via an interconnect that ensures a protocol indicating a procedure for preventing data inconsistency in a plurality of cache memories,
the controller causes, after detecting that the processor has updated data corresponding to any area of the nonvolatile main memory using the protocol, the updated data to be transmitted to the memory controller and writes the updated data to the nonvolatile cache memory,
the controller transmits, after receiving a first request for requesting data corresponding to a certain area of the nonvolatile main memory from the processor, the certain area being any area of the nonvolatile main memory, a first response message containing the data requested by the first request and information indicating that the data has been held in the nonvolatile cache memory, and detects, when receiving a second request for requesting to invalidate a cache line corresponding to the certain area from the processor after transmitting the first response message, that the processor has updated the data corresponding to the certain area, and
the controller, after receiving the second request, does not invalidate the cache line corresponding to the certain area but transmits a second response message for informing that the cache line corresponding to the certain area has been invalidated as a response to the second request, transmits a third request for requesting the data corresponding to the certain area after transmitting the second response message, receives the data updated by the processor as a response to the third request, and writes the received updated data to the nonvolatile cache memory.

2. The memory controller according to claim 1, wherein the controller transmits the first response message containing data read from the certain area of the nonvolatile main memory and the information indicating that the data read from the certain area has been held in the nonvolatile cache memory even when the data requested by the first request is not held in the nonvolatile cache memory.

3. The memory controller according to claim 1, wherein the third request is information for requesting the data corresponding to the certain area to update the data corresponding to the certain area updated by the processor, and
the controller does not update the updated data received as a response to the third request.

4. The memory controller according to claim 1, wherein the third request is information for causing a procedure for transmitting updated data to the processor,
the controller transmits the third request and writes the data transmitted as a response to the third request to the nonvolatile cache memory, and
the procedure for transmitting the updated data is determined by the protocol to transfer the updated data in the processor to the memory controller.

5. The memory controller according to claim 1, wherein the protocol is any one of an MESIF protocol, a QPI protocol, an MESI protocol, an MOESI protocol, or an MSI protocol.

6. An information processing apparatus comprising:
a memory controller; and
a processor, wherein
the memory controller comprises:
a nonvolatile cache memory configured to store a piece of data stored in a nonvolatile main memory connected to the memory controller; and
a controller configured to control writing of data to the nonvolatile cache memory,
the memory controller is connected to the processor via an interconnect that ensures a protocol indicating a procedure for preventing data inconsistency in a plurality of cache memories, and
the controller causes, after detecting that the processor has updated data corresponding to any area of the nonvolatile main memory using the protocol, the updated data to be transmitted to the memory controller and writes the updated data to the nonvolatile cache memory,
the controller transmits, after receiving a first request for requesting data corresponding to a certain area of the nonvolatile main memory from the processor, the certain area being any area of the nonvolatile main memory, a first response message containing the data requested by the first request and information indicating that the data has been held in the nonvolatile cache memory, and detects, when receiving a second request for requesting to invalidate a cache line corresponding to the certain area from the processor after transmitting the first response message, that the processor has updated the data corresponding to the certain area, and
the controller, after receiving the second request, does not invalidate the cache line corresponding to the certain area but transmits a second response message for informing that the cache line corresponding to the certain area has been invalidated as a response to the second request, transmits a third request for requesting the data corresponding to the certain area after transmitting the second response message, receives the data updated by the processor as a response to the third request, and writes the received updated data to the nonvolatile cache memory.

7. The information processing apparatus according to claim 6, wherein the information processing apparatus reads and updates first data on the nonvolatile main memory to the processor, and completes a commit process for persisting data at a time when the updated first data is stored in the nonvolatile cache memory as second data.

8. The information processing apparatus according to claim 6, comprising a setting unit configured to set a main memory to which persistent data is allocated.

9. An information processing apparatus comprising:
a processor; and
a memory controller connected to the processor via an interconnect, wherein
the processor comprises a cache memory configured to read and write data stored in a nonvolatile main memory connected to the memory controller, and store a piece of the data stored in the nonvolatile main memory,
the memory controller comprises:
a nonvolatile cache memory configured to store a piece of the data stored in the nonvolatile main memory; and
a controller configured to control writing of data to the nonvolatile cache memory,
the interconnect ensures a protocol for maintaining consistency between the cache memory of the processor and the nonvolatile cache memory of the memory controller,
the processor updates data corresponding to any area of the nonvolatile main memory, and transfers the updated data to the memory controller according to the protocol, and
the controller writes the updated data received from the processor to the nonvolatile cache memory,
the controller transmits, after receiving a first request for requesting data corresponding to a certain area of the nonvolatile main memory from the processor, the certain area being any area of the nonvolatile main memory, a first response message containing the data requested by the first request and information indicating that the data has been held in the nonvolatile cache memory, and detects, when receiving a second request for requesting to invalidate a cache line corresponding to the certain area from the processor after transmitting the first response message, that the processor has updated the data corresponding to the certain area, and
the controller, after receiving the second request, does not invalidate the cache line corresponding to the certain area but transmits a second response message for informing that the cache line corresponding to the certain area has been invalidated as a response to the second request, transmits a third request for requesting the data corresponding to the certain area after transmitting the second response message, receives the data updated by the processor as a response to the third request, and writes the received updated data to the nonvolatile cache memory.

\* \* \* \* \*